(12) United States Patent
Lejeune et al.

(10) Patent No.: US 10,477,869 B2
(45) Date of Patent: Nov. 19, 2019

(54) NACL SUBSTITUTE AGENT

(75) Inventors: Pascal Lejeune, Tourcoing (FR); Camille Dupuy-Cornuaille, Marcq-en-Baroeul (FR); Michael Bultel, Bousbecque (FR)

(73) Assignee: LESAFFRE ET COMPAGNIE, Paris (FR)

( * ) Notice: Subject to any disclaimer, the term of this patent is extended or adjusted under 35 U.S.C. 154(b) by 0 days.

(21) Appl. No.: 13/514,071

(22) PCT Filed: Oct. 21, 2010

(86) PCT No.: PCT/IB2010/054782
§ 371 (c)(1),
(2), (4) Date: Jun. 6, 2012

(87) PCT Pub. No.: WO2011/070454
PCT Pub. Date: Jun. 16, 2011

(65) Prior Publication Data
US 2012/0237636 A1    Sep. 20, 2012

(30) Foreign Application Priority Data
Dec. 8, 2009   (FR) ..................................... 09 05928

(51) Int. Cl.
*A21D 8/04*   (2006.01)
*A21D 8/02*   (2006.01)

(52) U.S. Cl.
CPC ................................... *A21D 8/047* (2013.01)

(58) Field of Classification Search
CPC ....................................................... A21D 8/047
USPC .......................................... 426/61, 649, 549
See application file for complete search history.

(56) References Cited

U.S. PATENT DOCUMENTS

| 4,192,897 A | * | 3/1980 | Kajinami ............. A23C 19/082 |
| | | | 426/520 |
| 4,486,456 A | * | 12/1984 | Thompson .................... 426/549 |
| 5,064,663 A | * | 11/1991 | Murray et al. .................. 426/60 |
| 6,066,343 A | * | 5/2000 | Megeed et al. ................. 426/20 |
| 2001/0022984 A1 | * | 9/2001 | Ferrari-Philippe .... A21D 2/267 |
| | | | 426/94 |
| 2004/0208957 A1 | * | 10/2004 | Domingues ............. A21D 2/02 |
| | | | 426/94 |
| 2009/0155408 A1 | | 6/2009 | Dupuy-Cornuaille et al. |
| 2010/0303853 A1 | | 12/2010 | Lejeune et al. |

FOREIGN PATENT DOCUMENTS

| EP | 0 103 994 A1 | 3/1984 |
| FR | 2 900 799 A1 | 11/2007 |
| FR | 2 922 728 A1 | 5/2009 |
| GB | 1 502 961 | 3/1978 |
| WO | WO 2008 074770 A1 | 6/2008 |
| WO | WO 2009 116050 A1 | 9/2009 |
| WO | WO2012033399 | * 3/2012 ............. A23L 1/237 |

OTHER PUBLICATIONS

Baysal, Z. et al. J. Hazardous Material. 161:62-67 (2009).*
International Search Report received in PCT/IB2010/054782.

* cited by examiner

*Primary Examiner* — Hamid R Badr
(74) *Attorney, Agent, or Firm* — Duane Morris LLP; Thomas J. Kowalski; Deborah L. Lu

(57) ABSTRACT

A novel substitute for sodium salt is described that comprises deactivated yeast and a salt compound selected from NaCl, a potassium salt, an ammonium salt, a magnesium salt and mixtures thereof. Also described are a composition comprising this new substitute and the use of this substitute in breadmaking and in prepared dishes.

10 Claims, No Drawings

1

NACL SUBSTITUTE AGENT

RELATED APPLICATIONS

The present application is filed pursuant to 35 U.S.C. § 371 as a U.S. National Phase application of International Patent Application No. PCT/IB2010/054782, which was filed on Oct. 21, 2010, claiming the benefit of priority to French Patent Application No. FR 09 05928 filed on Dec. 8, 2009. The entire content of each of the aforementioned applications is incorporated herein by reference in its entirety.

The invention relates to a novel agent as a substitute for salt (NaCl), to a composition intended for human and/or animal nutrition comprising said agent, and to the use of said agent as a full or partial substitute for NaCl.

For many years there has been a desire to reduce the amount of sodium present in food in general, and in particular in all foodstuffs identified as important sources of intake of salts, such as products from breadmaking and breakfast toast products, cooked meats, soups, ready meals, condiments and sauces. The excessive consumption of sodium has very harmful effects on health, and may in particular promote arterial hypertension. Accordingly, a certain number of public health authorities throughout the world recommend or require reduction of this sodium consumption in foods.

However, salt plays a fundamental role in breadmaking, and is a processing agent that is difficult to replace. In fact, besides its gustatory role, salt improves the physical properties of dough, and notably acts on the structure of the gluten network, on the oxidation of the dough by an antioxidant effect that delays bleaching and the loss of taste of bread that results from intensive kneading. Salt also has a role in the coloration of bread crust during baking, on the keeping qualities of bread, on the fermentation activity of yeast by slowing it down, which then influences the development of the steps of fermentation and of final proving.

The gustatory and flavour-enhancing effects of salt as well as its direct influence on the textural qualities of bread make it an ingredient that has an important role in breadmaking.

Consequently, reduction of the amount of salt in breadmaking poses technical problems for bakery professionals. In fact, this reduction in salt leads to disadvantages, for bakery dough, which are well known during processing owing to the loss of solidity of the gluten network. This loss of solidity most often affects the dough by at least one of the following aspects: loosening and stickiness, an excessive extensibility making it difficult to work, a lack of durability owing to considerable loss of $CO_2$ during fermentation (final proving step) due to an increase in porosity of the gluten network with respect to $CO_2$.

Finally, this salt reduction generally also causes disadvantages for the bread, which then has an insipid taste, a pale-coloured crust, a crumb that is too white, a loss of volume and a poorer appearance.

Various solutions have already been proposed for decreasing the amount of salt during breadmaking, such as addition of mineral compounds, of compounds derived from milk, and flavourings. However, the solutions proposed so far are still unsatisfactory in organoleptic respects, and moreover are incomplete, technically complex or even expensive. Furthermore, the generally non-bread origin of these solutions impedes their acceptance by the bakery profession.

Thus, there is still a need for a new substitute for NaCl, simple and natural, that can replace NaCl totally or partially in breadmaking, while preserving the known procedures in the manufacture of bakery dough, the familiar rheological characteristics of a good bakery dough, as well as the good physical and gustatory qualities of the bread resulting from this bakery dough when cooked.

The invention therefore relates to a substitute for NaCl that comprises deactivated yeast and a salt compound selected from NaCl, a potassium salt, an ammonium salt, a magnesium salt and a mixture thereof.

The salt substitute according to the invention offers the advantage of very significantly decreasing (up to 100% in certain types of applications) the amount of NaCl in bread-making products, while allowing a sufficient salt effect to be preserved even when the agent is used in a small amount.

Finally, the bread comprising the salt substitute according to the invention has the advantage of maintaining the same physicochemical and gustatory characteristics as bread that only comprises NaCl, namely, a crust that is crusty, a crumb that is soft and properly "honeycombed", and a flavour that is normally and usually salted.

Another object of the invention is a composition intended for human and/or animal nutrition comprising the agent as defined above.

A third object of the invention is the use of the agent, as defined above, as total or partial substitute for NaCl in breadmaking.

Preferably, the breadmaking is that of "traditional French bread".

Finally, a last object of the invention is the use of the agent, as defined above, as total or partial substitute for NaCl in prepared dishes.

The agent according to the invention can comprise only deactivated yeast and/or deactivated yeast comprising a cereal extract, such as a malt extract or a cereal malt. This deactivated yeast can be obtained by co-drying with a cereal extract. The cereal extract can be a malt extract.

The deactivated yeast is a so-called "dead" yeast, which can be obtained in various ways, such as thermal deactivation, optionally mixed with a cereal extract, such as a malt extract, or with a cereal malt. The yeast used is preferably a yeast belonging to the genus *Saccharomyces*, and more preferably to the species *Saccharomyces cerevisiae*, including that called *Saccharomyces carlsbergensis*.

In contrast to a yeast extract, which only comprises the soluble part of a yeast, the deactivated yeast comprises the whole of said yeast, consisting of a soluble part and an insoluble part.

Moreover, the deactivated yeast is technically much simpler to obtain since there is no separation step, in contrast to yeast extracts. Moreover, in contrast to yeast extracts, production of deactivated yeast does not require an autolysis step or physicochemical and/or biological means intended for optimizing the solubilization of the components of which the yeast extract is constituted.

Consequently, the deactivated yeast is an ingredient that does not involve a high cost for its production.

The potassium salt is preferably KCl, the ammonium salt $NH_4Cl$, and the magnesium salt $MgCl_2$.

The salt compound/deactivated yeast ratio can be between 1 and 5.7; and the NaCl/salt compound ratio can be between 0 and 100 wt. % relative to the total weight of the salt compound.

The agent according to the invention can further comprise another salt substitute selected from mineral compounds, compounds derived from milk, flavourings, and a mixture thereof.

The mineral compounds can include potassium chloride, ammonium chloride, sodium gluconate, potassium lactate.

The compounds derived from milk can include minerals obtained from milk, milk derivatives.

The agent according to the invention can moreover comprise a breadmaking improver selected from ascorbic acid, emulsifiers, stabilizing-thickening agents, enzymes and mixtures thereof. The agent according to the invention can comprise one or more ingredients having an improving effect, such as L-cysteine, stabilizing-thickening agents such as pregelatinized flour, modified starches, carboxymethylcellulose, gums such as xanthan gum, extracts of algae such as alginates or carrageenans or mixtures of these ingredients, emulsifiers such as lecithin, mono- and diglycerides of fatty acids or diacetyltartaric esters of mono- and diglycerides of fatty acids or mixtures of these ingredients, enzymes such as amylases, such as alpha-amylase, maltogenic alpha-amylase or other anti-staling alpha-amylases, hemicellulases such as xylanases, glucose oxidases, amyloglucosidases, lipases, phospholipases, cereal flours.

The improver can be in dry or liquid form. Its main role is to enhance the oxidizing function of the yeast. Furthermore, it can be added to compensate the sagging of bread dough.

Depending on its chemical nature, and notably when it is selected from ascorbic acid, certain bromates, the improver can be present in an amount in the range from about 10 to 200 ppm, preferably between 10 and 80 ppm, and more preferably between 20 and 50 ppm relative to the weight of the flour.

When it is selected from compounds such as vital gluten, it can be present in an amount in the range from about 0.3 to 2 wt. %, and preferably between 0.5 and 2 wt. % relative to the weight of the flour.

The composition according to the invention can moreover comprise at least one additive selected from texture-forming agents, such as microcrystalline cellulose; dextrose or magnesium stearate, additives, anti-agglomerating agents, such as calcium silicate, anti-lumping agents, such as wheat fibres, or processing aids. They can also be compounds that are of interest in terms of public health, such as fluorine and iodine or other salts such as magnesium salts.

The composition comprising the agent according to the invention can be that of a bread dough, of a brioche dough or of any other types of dough for breadmaking products (bakery, sweetened-dough pastries, pizza, etc.) whatever they are, or of all ready-made dishes.

The agent according to the invention can be used both in breadmaking and in the ready-meals industry, in culinary aids such as vegetable or meat broths.

The agent used according to the invention can comprise deactivated yeast alone and/or deactivated yeast comprising a cereal extract, in an amount in the range from about 0.4 to 1 wt. %, preferably from 0.6 to 0.8 wt. %, and even more preferably 0.7 wt. % relative to the total weight of flour in breadmaking.

The salt compound can be present in an amount in the range from about 0.9% to 1.6 wt. % relative to the total weight of flour in breadmaking, instead of a proportion between 1.8 and 2.4 wt. % relative to the total weight of flour in the existing bread dough preparations.

Thus, the use of the agent according to the invention may allow a decrease in the proportion of NaCl between 15 and 100 wt. %, and preferably between 20 and 50 wt. % and more preferably between 20 and 30 wt. % relative to the total weight of flour. The invention will now be illustrated by means of the following examples, which are only given by way of illustration.

EXAMPLE 1—TRADITIONAL FRENCH BREAD

Two compositions 1 and 2 of bread dough, of the "traditional French bread" type, were prepared, the first, conventional and known (control) comprising 2.2 wt. % of NaCl relative to the total weight of flour, the second, comprising the agent according to the invention with 1.6 wt. % of NaCl and 0.7% of deactivated yeast relative to the total weight of flour.

These two compositions were prepared using the same breadmaking scheme, called "vat proving" for 16 to 24 hours. This scheme is generally used for obtaining bread of the "traditional French bread" type.

Using this breadmaking scheme, it is possible to obtain a bread having the following principal organoleptic qualities:
cream-coloured crumb having a properly "honeycombed" texture,
optimum development of the volume of the dough after fermentation,
pleasant taste and aroma of the bread,
preservation of freshness of the bread.

| Composition 1 control | |
|---|---|
| So-called "traditional" wheat flour type 65 | 100% |
| Water | 65% |
| NaCl | 2.2% |
| Compressed yeast | 0.5% |

| Composition 2 according to the invention | |
|---|---|
| So-called "traditional" wheat flour type 65 | 100% |
| Water | 65% |
| Compressed yeast | 0.5% |
| NaCl | 1.6% |
| Deactivated yeast | 0.7% |

The amount of NaCl is therefore, for compositions 1 and 2 respectively, 2.2 and 1.6 wt. % relative to the weight of the flour. This is equivalent to making a decrease of about 27% of NaCl.

These two compositions are therefore mixed, kneaded, left to ferment and baked independently of one another according to the following procedure:

Step 1: Kneading

Compositions 1 and 2 are kneaded, at a temperature of about 25° C., either in a spiral kneader, speed 1 (4 min), then speed 2 (1.30 min), or in an oblique-shaft kneader, speed 1 (6 min), then speed 2 (5 min).

Slightly quicker but not significant smoothing is observed with composition 2.

Step 2: Fermentation Step (First Fermentation)

This step is carried out at a temperature of about 25° C. for 1 hour. The dough is then taken down, then put in a chamber at 5° C. for 24 hours.

A slightly quicker start of fermentation is observed with composition 2, and the dough is much more flexible. No correction is required, since the changes in rheology are not significant.

Step 3: Vat Proving

This maturation step is carried out for 24 hours, at 5° C. No difference is observed between the two compositions.

Step 4: Heating

This step lasts 2 hours at 25° C.

Composition 2 gives a slightly more extensible dough than composition 1.

Step 5: Division, Moulding and Holding (Second Fermentation)

Division, carried out manually so as to optimize the honeycombing of the finished products, gives dough balls of about 350 g each.

The dough balls are submitted to a conventional rolling for composition 1, and tighter rolling for composition 2 since the dough is a little more extensible, tight rolling allows a better application of force.

Holding then lasts 15 minutes.

Step 6: Shaping

This step is performed manually (recommended method) or mechanically with slackened rollers in order to ensure good honeycombing of the finished product.

The two compositions behave similarly.

Step 7: Final Proving (Third Fermentation)

This step takes about 30 min, at room temperature (about 25° C.).

No notable difference is observed with the two compositions, in degree of rise, or in tolerance.

Step 8: Baking

This last step is carried out in an oven for 20 minutes at 250° C.

No difference is observed with the two compositions, either in development in the furnace, or in knife cuts, or in coloration of the crust.

These two compositions 1 and 2 show that a reduction of about 27% of NaCl in a composition of bakery dough makes it possible to maintain the organoleptic qualities of the bread.

These two compositions underwent a sensory analysis test, called a triangular test. The purpose of this test is to demonstrate differences between two products without the characteristics to which these differences refer being identified. This test is used when the differences expected are small.

The principle of this test is as follows: three coded samples are presented, two are identical (come from the same product), the third being different a priori (comes from another product). The tester must determine the unrepeated sample, i.e. the sample that is different from the other two. It is a forced-choice test. The utmost vigilance is required regarding the homogeneity of the container, the amount presented as well as any other factor that could make it possible to recognize the single sample.

The results are interpreted as follows. To find out whether there is a significant difference overall, it is sufficient to record the number of correct responses and compare the value obtained with that given in the binomial law table for a probability of ⅓. The conclusions on whether or not there is a significant difference between the two products are given at a threshold below 5% (Sensory evaluation, manual of procedures, second Edition Lavoisier, TEC et DOC).

For examples 1 and 2, this test does not show any significant difference regarding the crusty texture of the crust, the soft texture of the crumb and the salty flavour between control composition 1 and composition 2.

EXAMPLE 2—BUNS

Two bun compositions 3 and 4 were prepared, the first, conventional and known (control) comprising 1.8 wt. % of NaCl relative to the total weight of flour, the second, comprising the agent according to the invention with 1.2 wt. % of NaCl and 0.7% of deactivated yeast relative to the total weight of flour.

These two compositions were prepared using the same breadmaking scheme, namely a so-called "sponge and dough" scheme where ⅔ of the water and the yeast undergo prefermentation for 4 hours at 24° C.

| Composition 3 control | |
|---|---|
| Flour | 100% |
| Water | 55% |
| Compressed yeast | 2.9% |
| Improver | 0.6% |
| Soya flour | 0.4% |
| Oil | 4% |
| NaCl | 2% |

| Composition 4 according to the invention | |
|---|---|
| Flour | 100% |
| Water | 55% |
| Compressed yeast | 2.9% |
| Improver | 0.6% |
| Soya flour | 0.4% |
| Oil | 4% |
| NaCl | 1.33% |
| Deactivated yeast | 0.7% |

The amount of NaCl is therefore, for compositions 3 and 4 respectively, 1.8 and 1.2 wt. % relative to the weight of the flour. This is equivalent to making a decrease of about 33% of NaCl.

These two compositions are therefore mixed, kneaded, left to ferment and baked independently of one another according to the following procedure:

The compositions 3 and 4 are kneaded in a spiral kneader at a temperature of about 25° C., i.e. in a spiral kneader, speed 1 (2 min), then speed 2 (3 min). Fermentation is then carried out at a temperature of about 28° C. for about 5 minutes. The dough is then divided into dough balls of about 90 g each. Holding (second fermentation) lasts about 57 min at 37° C.

The dough balls are then baked in the oven, 12 minutes at 235° C.

The organoleptic qualities of the bread obtained according to the composition of the invention, with a decrease in the amount of NaCl of about 33%, remain unchanged relative to the control bread.

In fact, the triangular test (described in example 1) gives 48% of false responses against 52% of correct responses. Consequently, there is no significant difference between the control composition 3 and composition 4 according to the invention.

EXAMPLE 3—BUNS

Two bun compositions 5 and 6 were prepared according to the same procedure as in example 2.

Composition 5 (control) comprises 1.8 wt. % of NaCl relative to the total weight of flour, composition 6 (according to the invention) comprises 1 wt. % of NaCl and 0.7% of deactivated yeast relative to the total weight of flour.

The decrease in NaCl in composition 6 is about 45% relative to composition 5 (control).

It is observed that the organoleptic qualities of the bread obtained according to the composition of the invention, with a decrease in the amount of NaCl of about 45%, remain unchanged relative to the control bread.

In fact, the triangular test (described in example 1) gives 57% of false responses against 43% of correct responses. Consequently, there is no significant difference between the control composition 5 and composition 6 according to the invention.

EXAMPLE 4—"BALTONOWSKI" BREAD

Firstly a composition of leaven is prepared, which comprises the following ingredients:

| | |
|---|---|
| Rye flour T720 | 100% |
| Water | 55% |
| Starter LV4 Lesaffre | 0.5% |

This leaven is prepared in a spiral kneader for 5 minutes, then left to mature for about 20 hours at 35° C. It is used in the preparation of the following compositions of bakery dough:

Two compositions 7 and 8 of Polish bread called "Baltonowski" were prepared, the first, conventional and known (control) comprising 1.8 wt. % of NaCl relative to the total weight of flour, the second comprising the agent according to the invention with 0.9 wt. % of NaCl and 0.6% of deactivated yeast relative to the total weight of flour.

These two compositions were prepared using the same breadmaking scheme.

| Composition 7 control | |
|---|---|
| Rye flour T720 | 40% |
| Wheat flour T750 | 60% |
| Water | 57% |
| NaCl | 1.8% |
| Compressed yeast | 3% |
| Starter LV4 Lesaffre | 0.2% |

| Composition 8 according to the invention | |
|---|---|
| Rye flour T720 | 40% |
| Wheat flour T750 | 60% |
| Water | 57% |
| NaCl | 0.9% |
| Compressed yeast | 3% |
| Starter LV4 Lesaffre | 0.2% |
| Deactivated yeast | 0.6% |

The amount of NaCl is therefore, for compositions 7 and 8 respectively, 1.8 and 0.9 wt. % relative to the weight of the flour. This is equivalent to making a decrease of about 50% of NaCl.

These two compositions are therefore mixed, kneaded, left to ferment and baked independently of one another according to the following procedure:

Compositions 7 and 8 are kneaded in a spiral kneader, speed 1 (7 min), then speed 2 (1.30 min) Fermentation is then carried out at a temperature of about 28° C. for about 4 hours. The dough is then divided into dough balls of about 600 g. Final proving (final fermentation) takes about 60 minutes at 35° C.

The dough balls are then baked in the oven, 10 minutes at 230° C., then about 28 minutes at 220° C.

It is observed that the organoleptic qualities of the bread obtained according to the composition of the invention, with a decrease in the amount of NaCl of about 50%, remain unchanged relative to the control bread.

In fact, the triangular test (described in example 1) gives 44% of false responses against 56% of correct responses. Consequently, there is no significant difference between the control composition 7 and composition 8 according to the invention.

EXAMPLE 5—LEAVEN BALL

Two compositions 9 and 10 of leaven ball were prepared, the first, conventional and known (control) comprising 2 wt. % of NaCl relative to the total weight of flour, the second comprising the agent according to the invention with 1.4 wt. % of NaCl and 0.7% of deactivated yeast relative to the total weight of flour.

These two compositions were prepared using the same breadmaking scheme.

| Composition 9 control | |
|---|---|
| Traditional flour | 90% |
| Rye flour T170 | 10% |
| Water | 54% |
| Salt | 2.2% |
| Cream of leaven | 5% |

| Composition 10 according to the invention | |
|---|---|
| Traditional flour | 90% |
| Rye flour T170 | 10% |
| Water | 54% |
| Salt | 1.4% |
| Cream of leaven | 5% |
| Deactivated yeast | 0.7% |

The amount of NaCl is therefore, for compositions 9 and 10 respectively, 2 and 1.4 wt. % relative to the weight of the flour. This is equivalent to making a decrease of about 36% of NaCl.

These two compositions are therefore mixed, kneaded, left to ferment and baked independently of one another according to the following procedure:

Compositions 9 and 10 are kneaded in a kneader, either in an oblique kneader speed (8 min), then speed 2 (2 min), or in a spiral kneader at a temperature of about 25° C., speed 1 (5 min), then speed 2 (30 seconds).

Fermentation is then carried out at a temperature of about 23° C. for about 14 hours or 12 hours at 25° C. The dough is then divided into dough balls of about 1000 g each. Holding (second fermentation) takes from about 20 to 30 min. The balls are then shaped, then put in second fermentation (final proving phase) for 3 hours at 25° C. before being baked for 50 minutes at 230° C. in a hearth oven.

It is observed that the organoleptic qualities of the bread obtained according to the composition of the invention, with a decrease in the amount of NaCl of about 36%, remain unchanged relative to the control bread.

In fact, the triangular test (described in example 1) gives 61% of false responses against 39% of correct responses. Consequently, there is no significant difference between the control composition 9 and composition 10 according to the invention.

The invention claimed is:

1. A method for reducing the amount of NaCl in breadmaking, comprising a step of totally or partially replacing NaCl with a NaCl substitute, said NaCl substitute consisting of deactivated yeast and NaCl, and optionally a cereal extract and/or a breadmaking improver selected from the group consisting of ascorbic acid, emulsifiers, stabilizing-thickening agents, enzymes and mixtures thereof, wherein the NaCl/deactivated yeast ratio is between 1 and 5.7.

2. The method according to claim 1, wherein the NaCl is totally replaced with the NaCl substitute.

3. The method according to claim 1, wherein the yeast belongs to the genus *Saccharomyces*.

4. The method according to claim 3, wherein the yeast belongs to the species *Saccharomyces cerevisiae*.

5. The method according to claim 1, wherein the cereal extract is a malt extract.

6. The method according to claim 1, wherein the breadmaking is the production of traditional French bread.

7. The method according to claim 1, wherein the deactivated yeast is present in an amount in the range from about 0.4 to 1 wt. % relative to the total weight of flour in breadmaking.

8. The method according to claim 7, wherein the deactivated yeast is present in an amount in the range from 0.6 to 0.8 wt. % relative to the total weight of flour in breadmaking.

9. The method according to claim 7, wherein the deactivated yeast is present in an amount of 0.7 wt. % relative to the total weight of flour in breadmaking.

10. The method according to claim 1, wherein NaCl is present in an amount in the range from about 0.9 to 1.6 wt. % relative to the total weight of flour in breadmaking.

\* \* \* \* \*